May 26, 1925. 1,539,748
G. LAROCHE
MACHINE FOR CUTTING PAPER LENGTHWISE AND REWINDING IT
Filed July 7, 1923 3 Sheets-Sheet 2

INVENTOR
GEORGES LAROCHE
BY
ATTORNEY

May 26, 1925. 1,539,748
G. LAROCHE
MACHINE FOR CUTTING PAPER LENGTHWISE AND REWINDING IT
Filed July 7, 1923 3 Sheets-Sheet 3
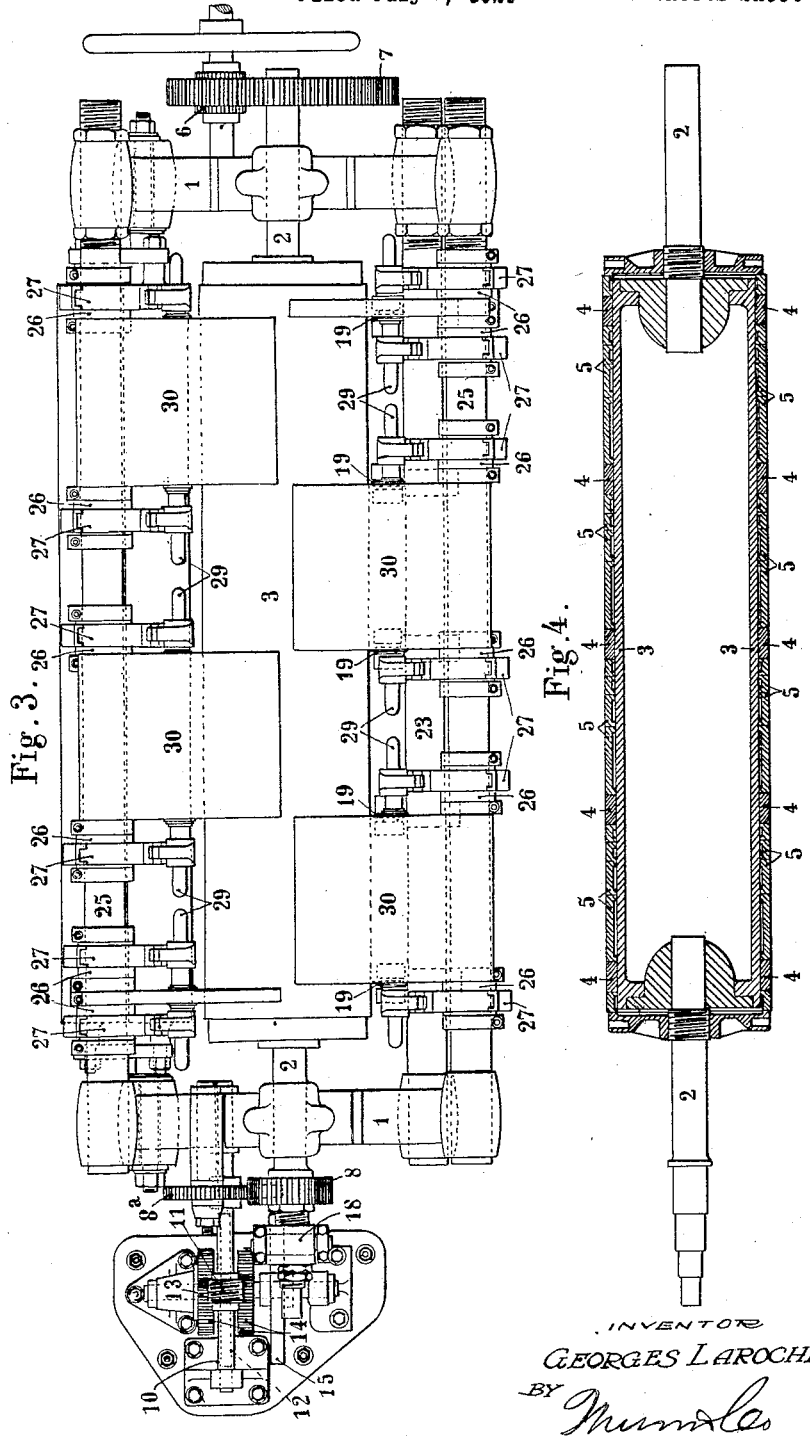
INVENTOR
GEORGES LAROCHE
BY
ATTORNEY Patented May 26, 1925.

1,539,748

UNITED STATES PATENT OFFICE.

GEORGES LAROCHE, OF NANTERRE, FRANCE, ASSIGNOR TO THE SOCIETE ANONYME DE LA PAPETERIE DE NANTERRE, OF NANTERRE, FRANCE.

MACHINE FOR CUTTING PAPER LENGTHWISE AND REWINDING IT.

Application filed July 7, 1923. Serial No. 650,071.

*To all whom it may concern:*

Be it known that I, GEORGES LAROCHE, of Avenue Jules Quentin à Nanterre, Seine, France, have invented Machines for Cutting Paper Lengthwise and Rewinding It, of which the following is a full, clear, and exact description.

This invention has for its object a machine for cutting paper lengthwise and rewinding it and capable of effecting the cutting and rewinding according to any widths.

This machine is substantially characterized by a smooth surface cylinder composed of a number of removable elementary cylinders, of different widths, some of them of very hard metal, the others made of cast-iron or other metal of less value so as to always present, in the cutting plane, a cylinder made of hard metal whatever may be the width of this cutting.

To this cylinder is imparted both a rapid rotary movement and a very slow reciprocating longitudinal movement, this latter movement being adapted to avoid the cutters from coming always at the same points of the cylinder.

The new machine comprises, in combination with the previous parts, rotary cutters capable of being laterally moved, at will, according to the widths of cuttings to be obtained.

Finally, reels, in suitable number, adapted to receive the cut out strips or bands, can be displaced according to the place where the cutting takes place and are driven by the cylinder on which they bear.

The invention is illustrated, by way of example only, in the accompanying drawing, in which:

Fig. 3 is a top plan view.

Fig. 4 is a section of the movable cylinder.

Figure 1:
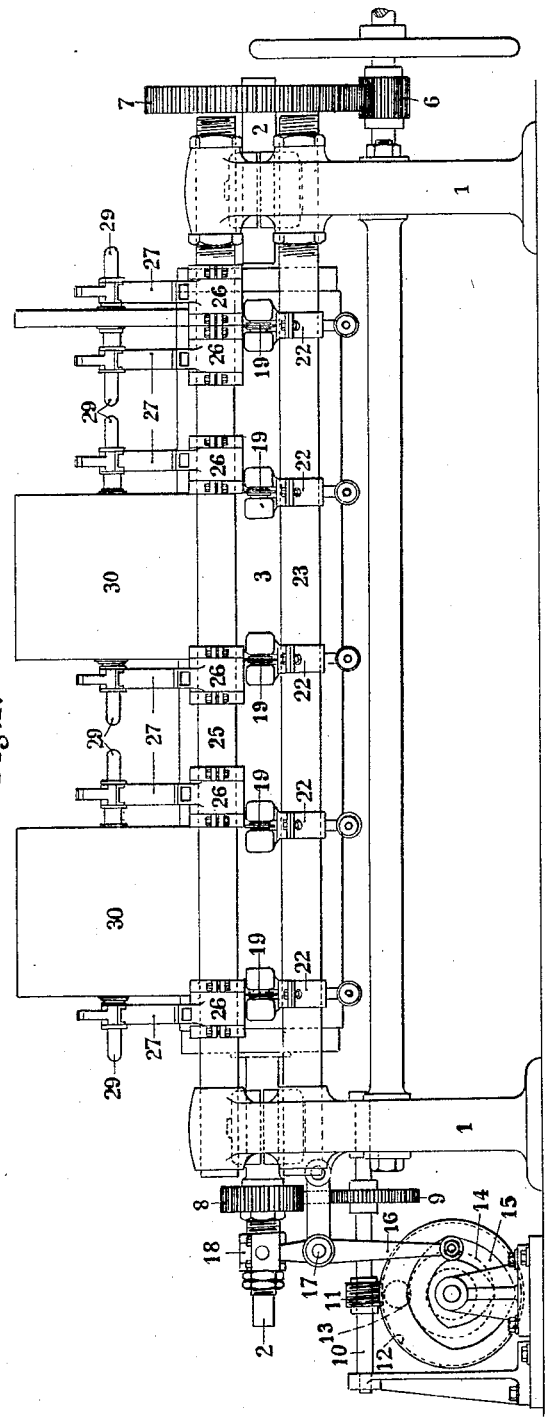
Fig. 1 is a side elevation of the machine.
Figure 2:
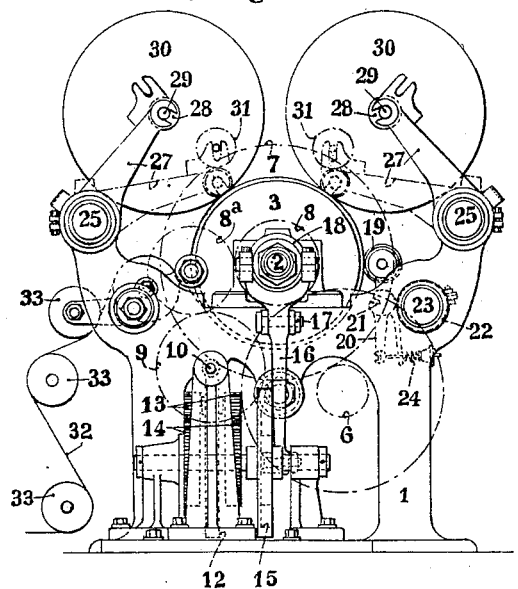
Fig. 2 is an end view.

As illustrated in the drawing, the machine comprises a frame formed of two cheeks 1 carrying the shaft 2 of a cylinder 3. The latter is formed, as illustrated in Fig. 4, by the juxtaposition, on the shaft 2, of a number of elementary cylinders such as 4 and 5.

The cylinders 4, all of the same width, are made of the hardest possible metal, such as hardened steel, hardened cast-iron, etc. The cylinders 5 have different widths and are made of any metal of low price.

The shaft 2 and, consequently, the cylinder 3 are subjected to two movements: a movement of rotation and a very slow reciprocating longitudinal movement. The movement of rotation is produced by a series of pinions 6 and 7. The longitudinal movement is determined by the following mechanism: On the shaft 2 is rigidly mounted a pinion 8, gearing with a pinion 8ª which, in its turn, engages with a toothed wheel 9, fast on a shaft 10, carrying a worm 11. This worm actuates a helical pinion 12 and, by a combination of planet pinions 13 and of pinions 14, a cam 15 which produces the displacement of a lever 16 the fixed point of which is at 17. The end of the lever 16 is pivoted to a collar mounted on the shaft 2.

It will therefore be understood that under the action of the cam the lever oscillates and longitudinally moves the shaft 2.

The cylinder 3 moves in front of a series of beveled rotary cutters 19 each carried by a lever arm 20 pivoting at 21, in a support 22 secured on a shaft 23. An adjustable compression spring 24 presses the knurling tool against the surface of the cylinder. The supports 22 can be unclamped so as to be displaced along the shaft 23, in order to adjust at will the position of the said rotary cutters.

The frame carries axes 23 on which are arranged rings 26 which can turn and slide on these axes in order to be placed in the required position. Each ring carries an arm 27 terminated by a lug 28 in which is fitted the axis 29 of a reel 30. The surface of this reel is constantly applied on the cylinder 3, sometimes by a roll forming a removable mass 31, position indicated in dot and dash lines, and sometimes owing to the weight of the paper wound on it, position shown in full lines.

The adjustment and operation of this machine are as follows:

Considering a determined width of cut to be obtained, the supports of the rotary cutters are caused to slide on the shaft 23, so that these rotary cutters occupy the required position. On the other hand, the elementary cylinders 4 and 5 are so combined as to place the cylinders 4 opposite the rotary cutters for the chosen widths of cut. Then the paper 32 is placed between the cylinders 33 and under the cylinder 3. The motor being started, the cylinder 3 receives a rotary movement and a very slow longitudinal movement owing to the speed reduction of the system of pinions and cam controlling the lever 16. In this manner each cutter 21 constantly presses at a new point of the cylinder 4 corresponding thereto. Thus, the formation of grooves is avoided, which would certainly take place if the cutter was always pressing on the same points of the surface of the cylinder.

The unwound paper automatically winds on the reels 30 which are suitably placed. The surface of these reels remains applied against the surface of the cylinder 3 owing to the weight of the reel itself. For starting the winding in a suitable manner, use is made, as already stated, of a mass 31 which increases the weight of the whole of the arm 27 and of the reel 30.

The advantages presented by this new machine are the following:

First it allows to effect the cutting according to any width owing to the possibility of adjustment of the cutters and reels. The cutting produced is perfectly neat and free from burrs, the surface in contact with the cutters being, as already stated, constantly displaced under the cutting edge of these cutters and, consequently, cannot be scratched by them. Finally, the decomposition of the main cylinder in small elementary cylinders, allows to obtain a considerable economy of construction whilst permitting to combine the various cylinders for placing the hardest under the cutters, whatever may be the width of cut to be obtained. In fact, it is obvious that a cylinder in one piece of extra hard metal and perfectly smooth would be of a much more high price than the combination realized in this machine. Finally the winding device is particularly simple and adjustable at will. It has, moreover, the advantage of giving to the paper such a tension that the winding is extremely tight.

The above arrangements are given by way of example only; the forms, materials and dimensions may be varied without departing thereby from the principle of the invention.

Claims:

1. In a machine for cutting paper lengthwise and winding it, a cylinder having a smooth surface, means for giving to the cylinder a rapid rotating movement, means for giving to the cylinder a slower longitudinal movement, adjustable rotary cutters mounted adjacent to the cylinder and moved by peripheral contact therewith, and reels adjustable in position.

2. In a machine for cutting paper lengthwise and winding it, a cylinder, a plurality of hardened rings mounted therein, spacing rings between the hardened rings, means to retain said rings securely upon the cylinder, adjustable rotary cutters mounted adjacent to the hardened rings of the cylinder and movable by the peripheral contact therewith, bobbins adjustable in position, and means to simultaneously rotate and reciprocate the cylinder.

3. In a machine for cutting paper lengthwise and winding the paper, a cylinder having a smooth surface, a system of gears giving to the cylinder a rapid rotating movement, a cam, means to rotate the same, a lever engaging the cam and connected with the cylinder, whereby to move the cylinder longitudinally, adjustable beveled rotary cutters beveled on the edge, mounted adjacent to the cylinder, and moved by the peripheral contact therewith, and reels adjustable in position.

4. In a machine for cutting paper lengthwise and winding the paper, a cylinder having a smooth surface, means for giving this cylinder a rapid rotating movement, means for giving this cylinder an alternative slower longitudinal movement, beveled rotary cutters mounted adjacent to this cylinder and moved by peripheral contact with the cylinder, reels adjustable in position, shafts for supporting the rotary cutters, and means for adjusting the tools therein.

5. In a machine for cutting paper lengthwise and winding it, a cylinder having a smooth surface, means for giving this cylinder a rapid rotating movement, means for giving this cylinder an alternative slower longitudinal movement, beveled rotary cutters adjustable in position, mounted adjacent to the cylinder and moved by peripheral contact with the cylinder, reels adjustable in position, supports for these reels, and means for adjusting the reels therein.

6. In a machine for cutting paper lengthwise, a cylinder having a smooth surface, means for giving this cylinder a rapid rotating movement, means for giving this cylinder an alternative slower longitudinal movement, rotary cutters beveled on the edge, adjustable in position, mounted adjacent to the cylinder and moved by peripheral contact with the cylinder, reels, a shaft, a plurality of supports for these reels rotatably mounted on the shaft.

7. In a machine for cutting paper lengthwise and winding the paper, a cylinder having a smooth surface, means for giving to this cylinder a rapid rotating movement, means for giving to this cylinder an alternative slower longitudinal movement, rotary cutters beveled on the edge, adjustable in position, mounted adjacent to the cylinder and moved by peripheral contact with the cylinder, reels adjustable in position, rotatable supports for these reels, and masses serving to weight the rolls at the beginning of the winding operation.

The foregoing specification of my "Machine for cutting paper lengthwise and rewinding it," signed by me this 20th day of June 1923.

GEORGES LAROCHE.